(12) United States Patent
Kounin et al.

(10) Patent No.: US 7,411,909 B2
(45) Date of Patent: Aug. 12, 2008

(54) SYSTEM AND METHOD FOR REGULATING DATA TRAFFIC IN A NETWORK

(75) Inventors: Dilian Kounin, Ryde (AU); Brett Woollard, South Turramurra (AU)

(73) Assignee: Cisco Technology, Inc., San Jose, CA (US)

( * ) Notice: Subject to any disclaimer, the term of this patent is extended or adjusted under 35 U.S.C. 154(b) by 561 days.

(21) Appl. No.: 11/060,955

(22) Filed: Feb. 17, 2005

(65) Prior Publication Data

US 2006/0182121 A1  Aug. 17, 2006

(51) Int. Cl.
*H04L 12/26* (2006.01)
*H04L 12/56* (2006.01)
*H04L 12/28* (2006.01)

(52) U.S. Cl. .................. 370/232; 370/395.53

(58) Field of Classification Search ......... 370/229–235, 370/351, 389, 395.1, 395.5, 395.53
See application file for complete search history.

(56) References Cited

U.S. PATENT DOCUMENTS

| | | | |
|---|---|---|---|
| 6,532,234 B1 * | 3/2003 | Yoshikawa et al. ....... 370/395.4 |
| 6,680,906 B1 | 1/2004 | Nguyen | |
| 7,146,438 B2 * | 12/2006 | Han ............................. 710/29 |
| 7,274,666 B2 * | 9/2007 | Balakrishnan et al. ...... 370/232 |
| 2002/0027906 A1 * | 3/2002 | Athreya et al. .............. 370/386 |
| 2003/0147399 A1 * | 8/2003 | Burns ...................... 370/395.4 |
| 2004/0076161 A1 * | 4/2004 | Lavian et al. .......... 370/395.41 |
| 2004/0213210 A1 * | 10/2004 | Dube et al. .................. 370/352 |
| 2007/0036162 A1 * | 2/2007 | Tingle et al. ................. 370/392 |
| 2007/0147238 A1 * | 6/2007 | Kadambi et al. ............ 370/229 |

* cited by examiner

*Primary Examiner*—Hassan Kizou
*Assistant Examiner*—Betty Lee
(74) *Attorney, Agent, or Firm*—Trellis Intellectual Property Law Group, PC

(57) ABSTRACT

A method and system for regulating the flow of data packets in a data switching network environment is provided. The network comprises at least one virtual local area network (VLAN), at least one provider edge (PE), and a data switching system. The method comprises the steps of configuring flow policy criteria for data packets for each VLAN and regulating the flow of data packets between the VLAN and the data switching system according to the flow policy criteria. The system for regulating the flow of data packets comprises the means for performing the method steps given above. The method can also regulate the flow of data packets, by defining the flow policy criteria for each virtual forwarding instance (VFI) in the network.

19 Claims, 6 Drawing Sheets

SYSTEM AND METHOD FOR REGULATING DATA TRAFFIC IN A NETWORK

BACKGROUND OF THE INVENTION

1. Field of Invention

This invention relates in general to data traffic regulation in networks. More specifically, the invention relates to methods and systems for data traffic regulation in a data switching environment such as virtual private local area network systems.

2. Description of the Background Art

The need to transfer data such as work files, audio files, etc., has increased exponentially today. This has given rise to the concept of connecting customer edges such as computer workstations, data servers, etc., by local area network (LAN) and wide area network (WAN) and Internet, depending on the geographical distribution of the customer edges. Data transfer needs also gave rise to virtual LAN (VLAN), wherein the data transfer takes place in the same manner as customer edges are connected in a LAN, despite the geographical separation between them. VLAN is defined as a group of devices on different physical LAN segments that can communicate with each other as if they were all on the same physical LAN segment. Data transfer between customer edges present in two different VLANs is possible with the help of data switching environments, which enables data transfer at faster rates. Various VLANs are connected to a provider edge (PE) and various provider edges (PEs) are connected to a data switching system. In one of the networking solutions, various VLANs are connected to multiple provider edges (PEs). These PEs are interconnected with the help of a data switching system to create a single distributed VLAN, which appears as a single entity. Two different provider edges are connected to each other virtually by one or more virtual circuits (VCs) through which the data transfer takes place with the help of the data switching system. Data switching system provides the infrastructure to enable the exchange of data between various VLANs, LANS, virtual private networks (VPN), and the like. Exemplary data switching systems include multi protocol label switching system (MPLS) that enables data transfer in a data switching environment, such as virtual private LAN systems (VPLS).

When a user wants to send any data packet to another user in the same VLAN but at a geographically distributed site, the data packet transfer in a data switching environment takes place in the following manner. The user in the VLAN sends the data packet to a provider edge connected to it. At the provider edge, the data packet is transferred to one or all the active VCs connected to the provider edge. Each of these VCs subsequently sends the data packet through the data switching system to another provider edge, to which the recipient customer edge is connected. This provider edge then transfers the data to the recipient customer edge.

However, in this communication, the data packets can get replicated on all the active VCs before sending them to the data switching system. This results in the flooding of the data traffic, which may in turn hampers the smooth transfer of data and results in delays and loss in data transmission. It also disrupts the working of the data switching system.

DETAILED DESCRIPTION OF EMBODIMENTS OF THE INVENTION

The invention provides a method, a system, and a computer program product for regulating flow of data packets in a data switching network such as a Virtual Private LAN system (VPLS) network. The data switching network includes one or more Virtual Local Area Networks (VLAN) connected through provider edges. Each VLAN includes one or more customer edge. The communication between VLANs associated with different provider edge takes place via a data switching system such as a multi protocol label switching system (MPLS). The various embodiments of the present invention enable the regulation of network traffic through the data switching system. The regulation is based on one or more flow policy criteria on a per VLAN/virtual Forwarding Instance (VFI) basis. The criteria could be the data packet flow rate associated with the different types of data packets.

Figure 1:
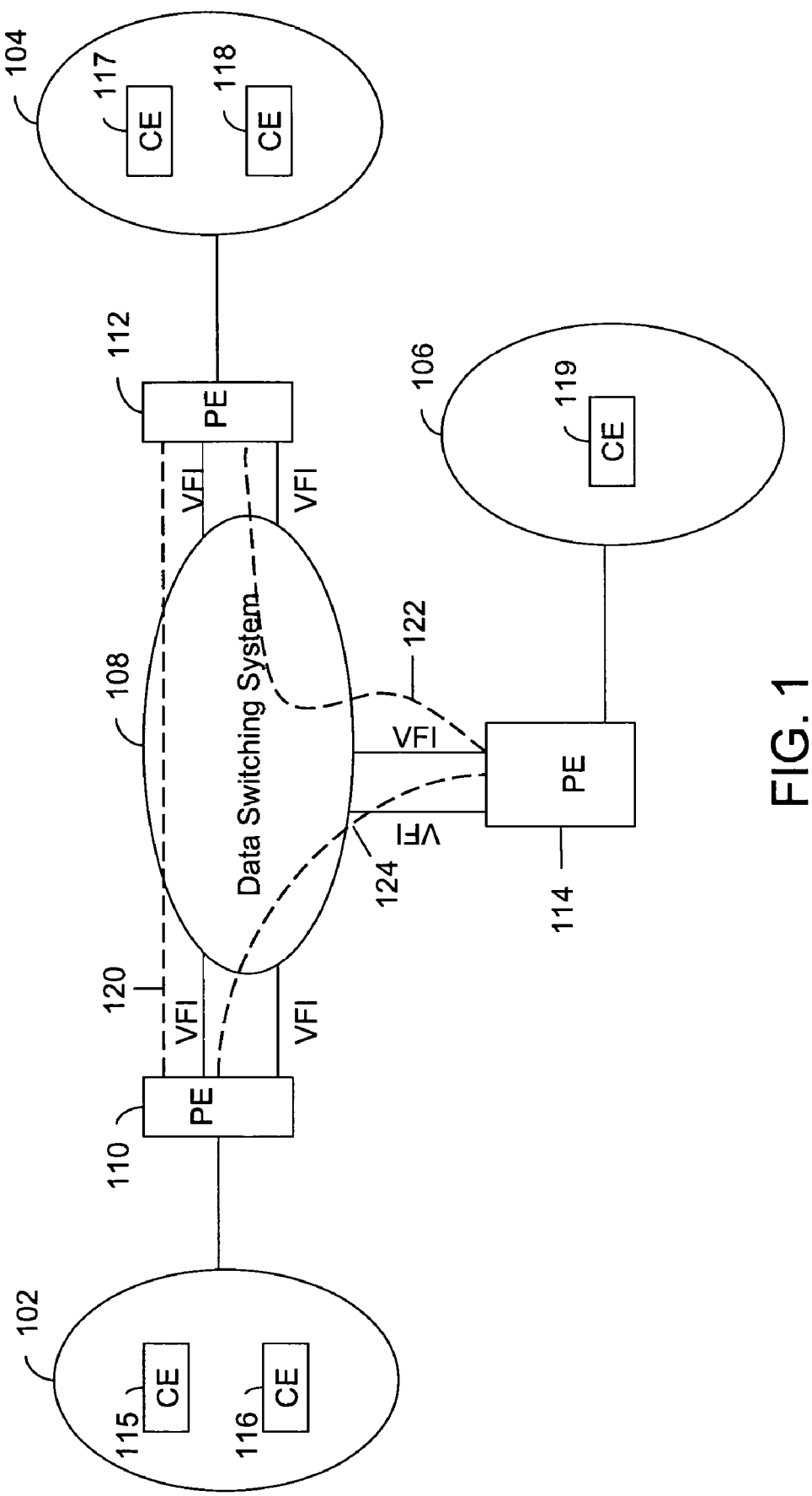
FIG. 1 illustrates a data switching environment in a virtual local area network system, in accordance with an exemplary embodiment of the present invention.

FIG. 1 illustrates a data switching environment in a virtual local area network system, in accordance with an exemplary embodiment of the present invention. As shown in the figure, the data switching environment includes plurality of virtual local area networks (VLAN) such as VLAN 102, 104 and 106. VLAN 102 includes customer edges 115 and 116, which are connected to a provider edge 110 through communication channels. Customer edges can be one of a personal computer, a data server, local area network (LAN) and the like. Different VLANs in the network can have different number of customer edges. Every VLAN is connected to a single provider edge. A single provider edge can be connected to more than one VLAN. Provider edge 110 is connected to data switching system 108 through a communication channel. In an embodiment of the invention, data switching system 108 can be a multi protocol label switching system (MPLS). Various provider edges in the network, such as provider edge 112 and 114, are also connected to data switching system 108 through communication channels. The transfer of data packets between the various customer edges takes place though virtual circuits (VCs). In one embodiment of the invention, a virtual circuit 120 virtually connects provider edge 110 to provider edge 112 through data switching system 108. In an embodiment of the invention, data switching system 108 and VLANs 102, 104, and 106 are part of a VPLS network.

When a user wants to send any data packet to another user present in the same VLAN but at a geographically distributed site, the data packet transfer takes place in the following manner. In an exemplary embodiment of the invention, a user in VLAN 102 sends a data packet to provider edge 110. VLAN 102 can be connected to PE 110 via Ethernet, Giga Ethernet and the like. Provider edge 110 then identifies the type of data packet and accordingly transfers the data packet to a recipient customer edge such as a customer edge 117. There are different types of data packets that can be transferred by data switching system 108, the data packet can be one of unicast, multicast and broadcast. For example, in case of a multicast data packet, at provider edge 110, the data packet is replicated and transferred to all the active VCs connected to provider edge 110. Each of these VCs subsequently sends the data packet through data switching system 108 to provider edge 112 to which the recipient customer edge is connected. Provider edge 112 then transfers the data to recipient customer edge 117 through VLAN 104. In an embodiment of the invention, VLAN 102 and 104 can be present in the same VLAN but at geographically distributed sites. The replication can, however, lead to flooding of traffic at data switching system 108.

Every VLAN has a communication channel to connect to data switching system 108, where the communication channel has a capacity to transfer data. The flooding of traffic can take place if the capacity is surpassed. The replication of the data packets on each active VC, and further transfer of the data packets by the VCs from the VLAN to data switching system 108, can lead to the flooding of data packets. The problem of flooding arises not only from the user side of the network, i.e., when the data is transferred from a user in a VLAN to data switching system 108, but also due to the data transfer from data switching system 108 to a VLAN. In order to protect data switching system 108, there is a need to monitor and suppress the number of packets sent to data switching system 108. The various embodiments of the present invention are used to regulate the traffic of data packets based on various criteria such as the rate of data flow and the data type.

Figure 2:
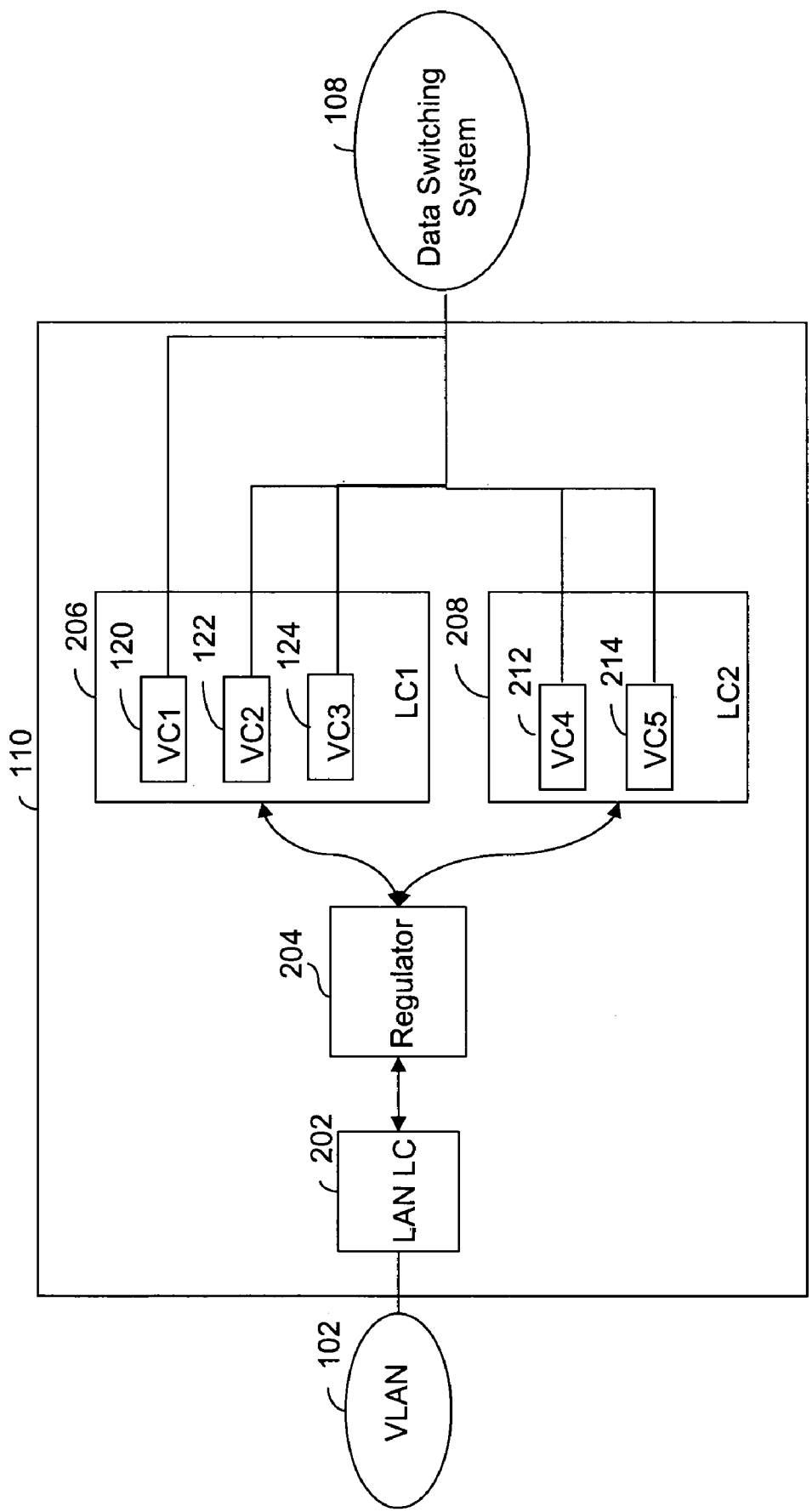
FIG. 2 illustrates a provider edge in the data switching environment, in accordance with an exemplary embodiment of the present invention.

FIG. 2 illustrates a provider edge in the data switching environment, in accordance with an exemplary embodiment of the present invention. As shown in the figure, exemplary provider edge 110 is connected to VLAN 102 and data switching system 108. Provider edge 110 includes a local area network line card (LAN LC) 202 connected to VLAN 102, a regulator 204 connected to LC 202, and a plurality of VCs. LC 202 can include a supervisor (SP). Regulator 204 is connected to one or more line cards, for example, two LCs 206 and 208. Every LC has some active VCs situated on it. For example, LC 206 has three active VCs 120, 122 and 124 while LC 208 has two active VCs 212 and 214 situated on it. Each VC is connected to data switching system 108. Regulator 204 regulates the flow of traffic to and from data switching system 108. LCs such as a Leto card and the like, along with the SP such as Encoded Address Recognition Logic (EARL) help in the data packet transfer. In an embodiment of the invention, each of LC 206 and 208 includes a data packet flow regulator 220, which helps in regulating the data packet traffic in a network with the help of regulator 204. The various functions of data packet flow regulator 220 are explained in detail in the description that follows.

In an exemplary embodiment of the invention, the data transfer takes place in the following manner. A user in VLAN 102 sends a data packet to provider edge 110. LAN LC 202 receives the data packet. Regulator 204 identifies whether the data packets satisfy a flow policy criteria defined for the VLAN. Regulator 204 can also update LC 202 regarding the data traffic associated with VLAN 102. Regulator 204 includes various components, to monitor and regulate the data traffic. In case the flow packet criteria is satisfied, the data packet is replicated and transferred to the active VCs connected to it, for example VC 120, 122, and 124 on LC 206 and VCs 212 and 214 on LC 208. In case there is only one active VC, replication is not performed. Each of these VCs subsequently sends the data packet through regulator 204 to data switching system 108. Further, data switching system 108 transfers the data to a recipient customer edge. The recipient customer edge can reside on another provider edge such as provider edge 112.

Figure 3:
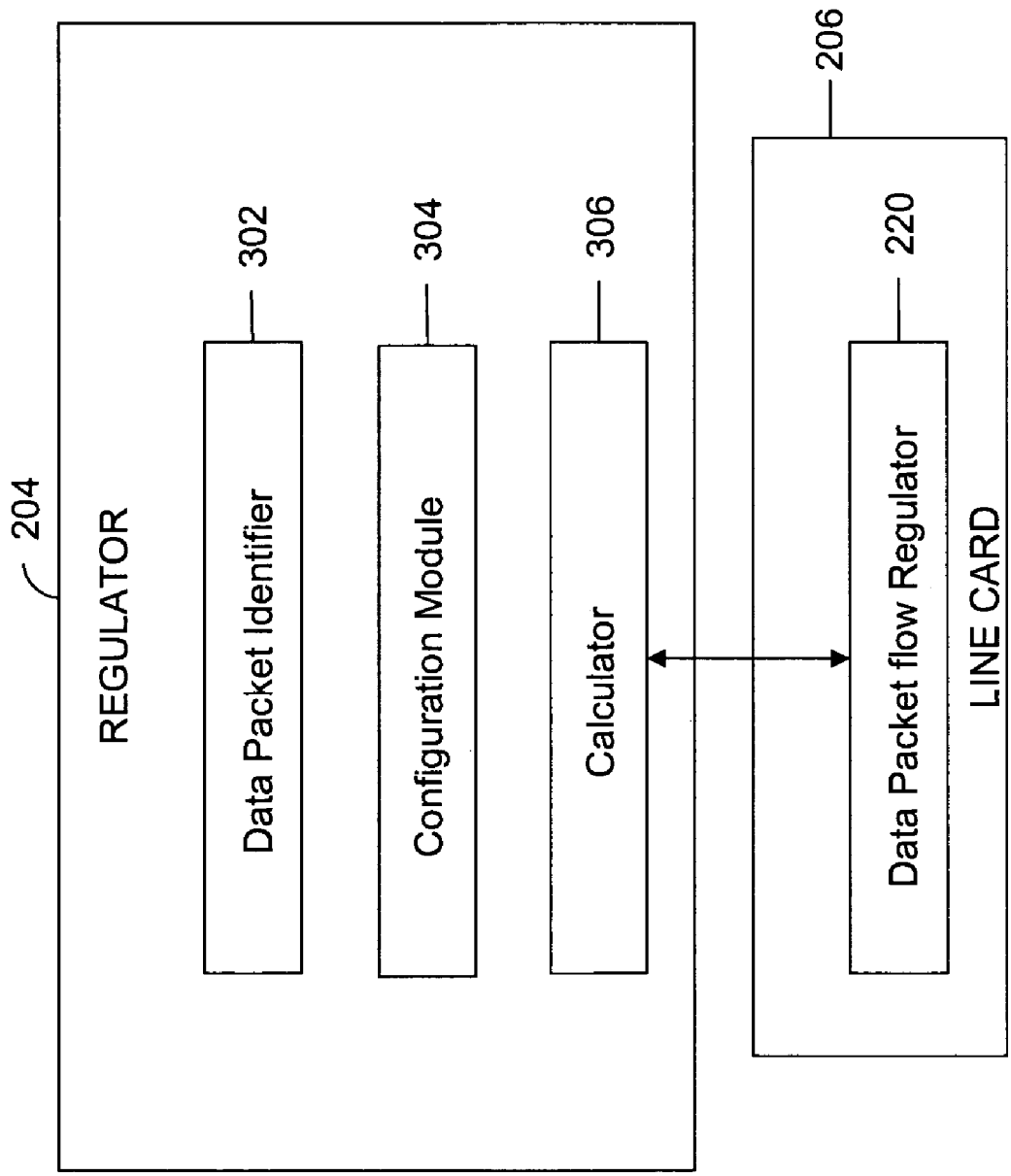
FIG. 3 depicts a system for regulating the flow of data packets, in accordance with an exemplary embodiment of the present invention.

FIG. 3 depicts a regulator, in accordance with an exemplary embodiment of the present invention. Regulator 204 includes a data packet identifier 302, a configuration module 304, a calculator 306 and data packet flow regulator 220. In an embodiment of the invention, data packet flow regulator 220 can reside in LC 206 and LC 208. In various embodiments of the invention, regulator 204 and its elements can be implemented as software, hardware, firmware and their combination thereof.

Data packet identifier 302 identifies the type of the received data packet. Configuration module 304 is used to configure the flow policy criteria for a particular type of data packet. In an embodiment of the invention, the flow policy criteria can be varied with the data type. In an embodiment of the invention, a user can configure the flow policy criteria for each type of data packet. In another embodiment of the invention, the flow policy criteria can be pre-programmed. In an embodiment of the invention, configuration module 304 includes a command line interface (CLI), wherein the appropriate commands for configuring the flow policy criteria can be entered by the user.

In an embodiment of the invention, the flow policy criteria can be a suppression level for data packet flow rate from a specific VLAN, i.e., defining a limit for data packet flow rate beyond which data packets are not to be transmitted to the recipient customer edge. In an embodiment of the invention, the suppression level can be different for the different data types. In another embodiment of the invention, a common suppression level can be defined for the various data types. In another embodiment of the invention, a common suppression level can be defined for all the VLANs.

Calculator 306 calculates the value of a parameter associated with the configured flow policy criteria. In an embodiment of the invention, calculator 306 calculates the data packet flow rate. Further, the calculated parameters by calculator 306 are conveyed to data packet flow regulator 220. In one embodiment of the invention, data packet flow regulator 220 can be a part of regulator 204. Further, details regarding the calculation of data flow rate is described later in the description.

Subsequently, data packet flow regulator 220 determines whether the data packets are to be transferred to data switching system 108 or not. If the calculated value of the parameter satisfies the flow policy criteria, the data packets are allowed. If the calculated value does not satisfy the flow policy criteria, the data packets are disallowed. For example, based on the data packet flow rate and the suppression level, the data packet flow is regulated by data packet flow regulator 220. In one embodiment of the invention, the user can be informed about the flow rate of the data packets by using a user notification module. In another embodiment of the invention the user can be informed about the dropped packets by using the user notification module.

Calculator 306 calculates the data packet flow rate to be sent to data switching system 108 based on the input VLAN data packet rate and the number of active VCs. In an embodiment of the invention, calculator 306 can be a part of LC 206. In the case of multicast data packets, all the input VLAN data packets are replicated on all the active VCs present in the provider edge. Hence, the flow rate of the data packets sent to data switching system 108 is the result of the multiplication of the number of input VLAN data packets and the number of active VCs. Calculator 306 is pre-programmed to calculate the data packet flow rate according to the following equation:

$$R_{out} = R_{in} * N_{vcs}$$

$R_{out}$—Data packets output rate to the data switching system $R_{in}$—Data packets input rate from VLAN $N_{vcs}$—Total number of active VCs associated with the VLAN In an embodiment of the invention, the suppression levels are configured taking into account the various types of data packets, i.e., defining a limit for a particular type of data packet flow rate beyond which that type of data packet is not to be transmitted to the recipient customer edge. In addition, the suppression levels can also be configured based on bytes rate, and packet rate. Each VLAN can be configured with separate suppression control levels that are used to suppress different data packet types independently. In another embodiment of the invention, the user can enable or disable regulator 204 by using configuration module 304. Disabling regulator 204 results in the transfer of data without intervention from the regulator, i.e., the regulator does not check whether the flow policy criteria are satisfied.

Figure 4:
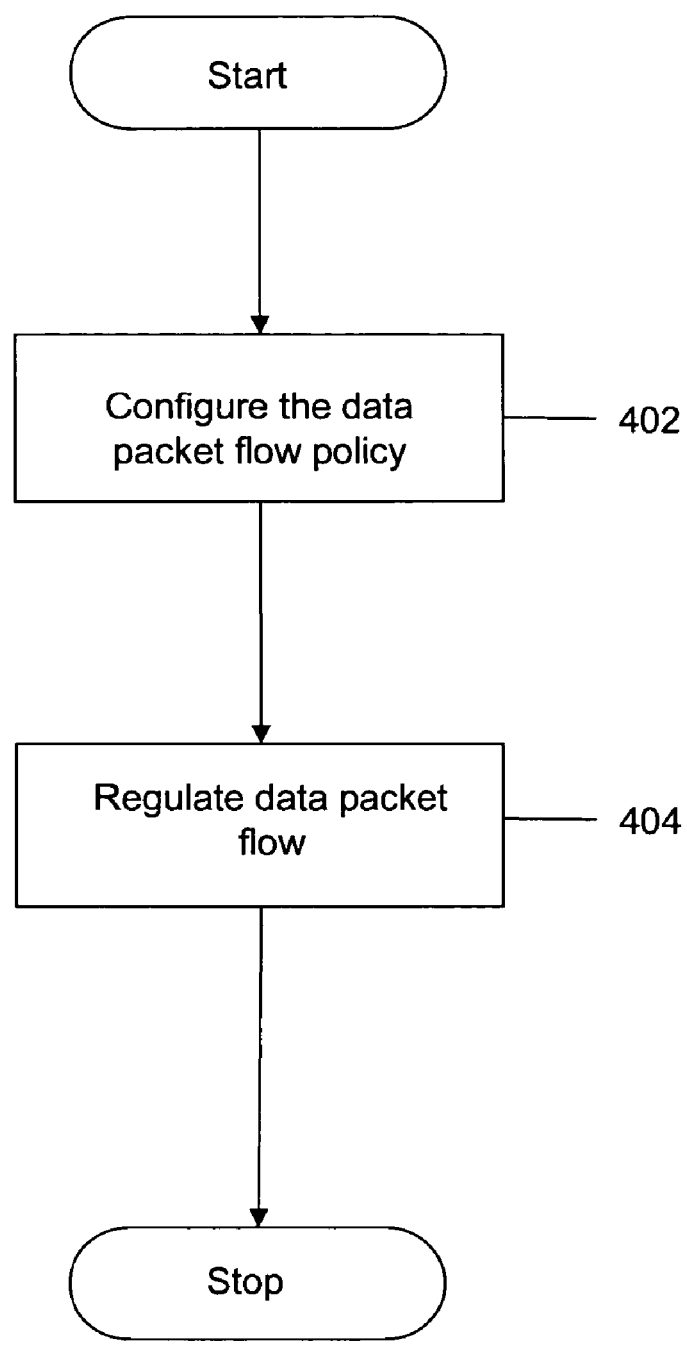
FIG. 4 is a flow chart depicting a method for regulating flow of data packets in a network, in accordance with one embodiment of the present invention.

FIG. 4 is a flow chart depicting a method for regulating the flow of data packets in a network, in accordance with one embodiment of the present invention. Regulator 204 allows the user to configure the data packet flow policy at step 402. This includes defining the flow policy and associated criteria on a per VLAN basis, i.e. defining the flow policy criteria for each of the VLANs. In another embodiment of the invention, the flow policy criteria can be defined on a per VFI basis. Once the flow policy is configured, regulator 204 regulates the data packet flow according to the configured flow policy at step 404. If the data packets satisfy the flow policy criteria, they are allowed. Otherwise, they are not allowed, thereby reducing the traffic on data switching system 108. In another embodiment of the invention, data traffic from data switching system 108 to a customer edge on a VLAN is regulated based on the method described above. In an embodiment of the invention, if the data packets do not satisfy the flow policy criteria, they are suppressed temporarily. The data packets are allowed as soon as the data packets are able to satisfy the flow policy criteria. In another embodiment of the invention, data packets are dropped if they do not satisfy the flow policy criteria. In another embodiment of the invention, regulator 204 also updates LC 206 and 208 regarding the data traffic associated with each VLAN, for example VLAN 202.

Figure 5:
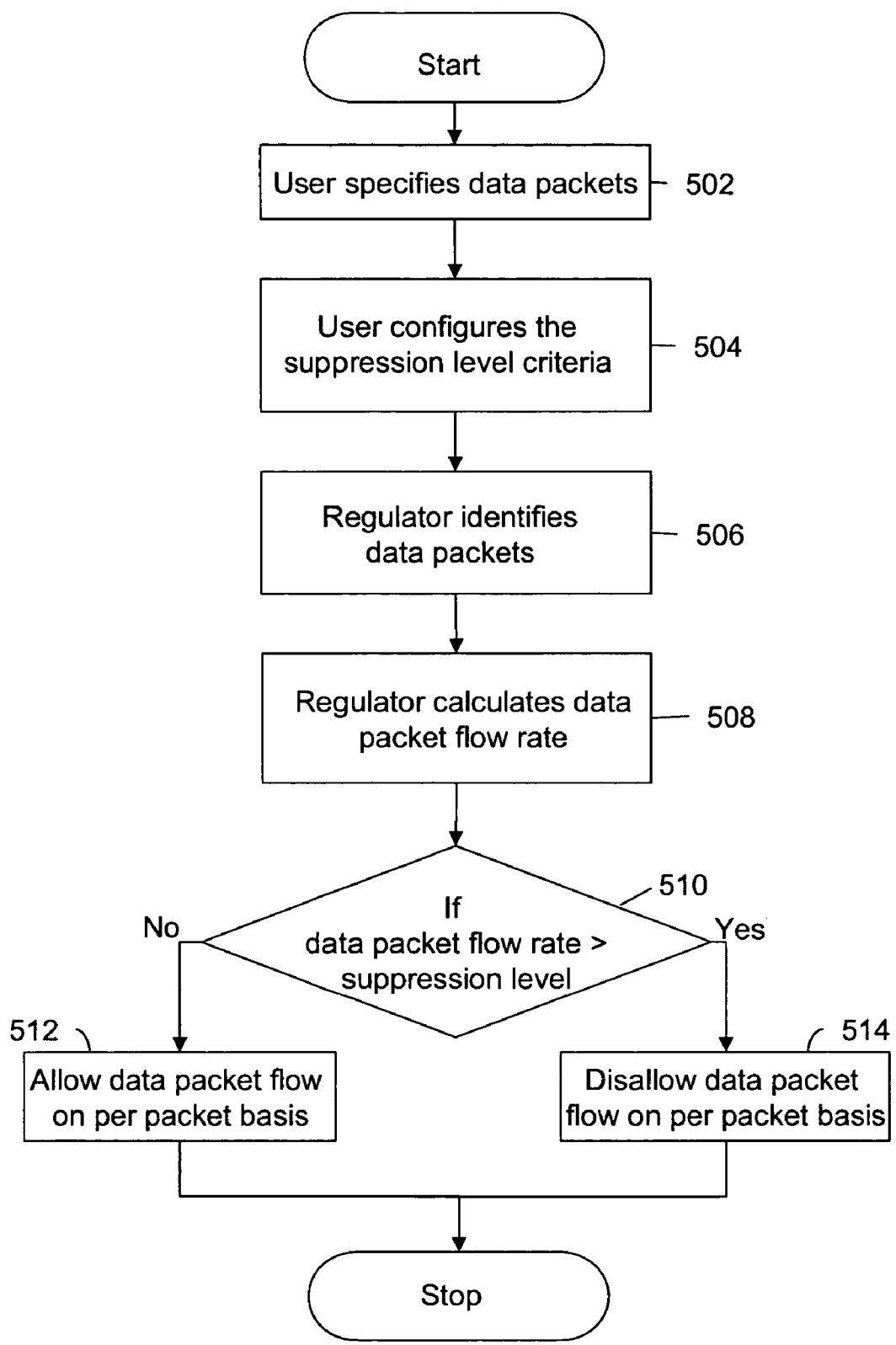
FIG. 5 is a flow chart depicting a method for regulating flow of data packets in a network, in accordance with another embodiment of the present invention.

FIG. 5 is a flow chart depicting a method for regulating the flow of data packets in a network, in accordance with another embodiment of the present invention wherein the data packet flow policy is based on a level of suppression, i.e., the flow of the data packets is suppressed above the suppression level. At step 502, a user specifies the type of data packets to be regulated. Further, the suppression levels are configured for the data packets to be regulated at step 504. The user can configure the data packet flow policy with respect to the type of data packets and the suppression levels for each type of data packet. At step 506, regulator 204 identifies the data packet and the type of data packets with the help of data packet identifier 302. Then, the data packet flow rate is calculated at step 508 with the help of calculator 306. Calculation of data packet flow rate is based on the number of active VCs. Once the data packet flow rate is calculated, the data packet flow regulator 220 of checks at step 510 if the calculated data packet flow rate is higher than the suppression level. If the data packet flow rate is higher than the suppression level, data packet flow regulator 220 disallows the flow of data packets at step 514. If the data packet flow rate is below the suppression level, data packet flow regulator 220 allows the flow of data packets at step 512. In an embodiment of the invention, LC 206 is updated regarding the traffic flow associated with the VLAN, i.e., whether the packets are allowed or not. Further, in case the traffic flow is not allowed, the reason for the same is conveyed to LC 206.

Figure 6:
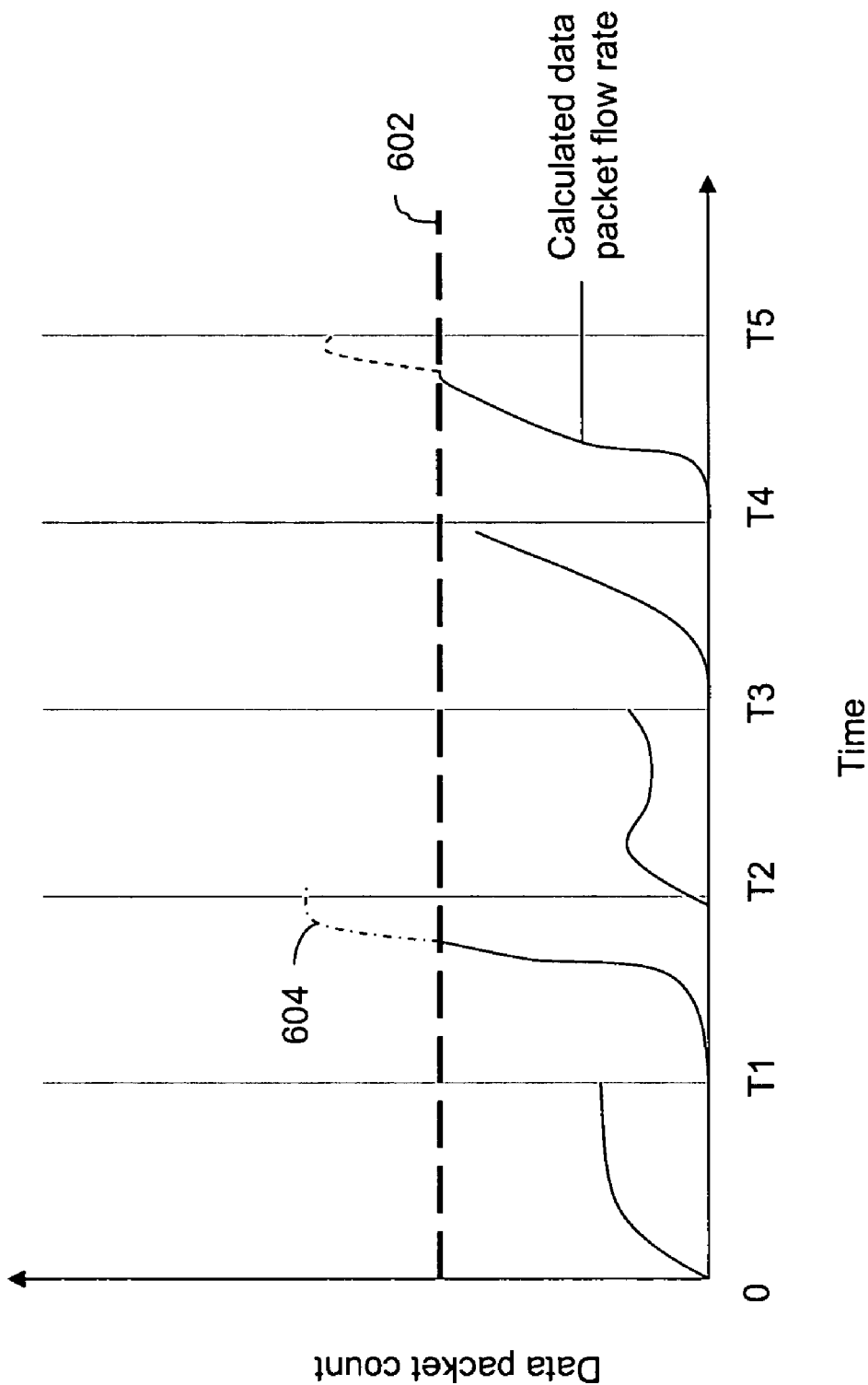
FIG. 6 is a suppression graph of a virtual local area network, in accordance with an exemplary embodiment of the present invention

FIG. 6 is a suppression graph of a VLAN, in accordance with an exemplary embodiment of the present invention. The graph is a plot of data packet count (on Y-axis) vs. time (on X-axis). A dotted line 602 indicates the configured suppression level for the data packet flow. Calculator 306 of regulator 204 calculates the flow of data packets for which the suppression levels are configured for each VLAN. The calculation takes place over a fixed interval of time, such as a one-second interval. The lines show the calculated data packet flow rate with respect to time. During the interval, the data packet count is compared with the configured suppression level. Once the level is reached, further packets are suppressed/dropped for the rest of the interval. For example, as shown in the graph, between the time cycle T1-T2, as soon as the data packet count exceeds the suppression level, the data packets are not transmitted to data switching system 108. This is depicted by a dotted line 604.

Embodiments of the present invention have the advantage that data switching networks such as the MPLS core network can be protected from the flooding of data traffic by suppressing data packets above the level of suppression. The suppression level can be defined on a per VLAN/VFI basis, i.e., there can be different suppression levels for different VLANs. The various embodiments of the invention allow protection of the core network from the flooding of data packets coming to and from the data switching system.

Any suitable programming language can be used to implement the routines of the present invention including C, C++, Java, assembly language, etc. Different programming techniques such as procedural or object oriented can be employed. The routines can execute on a single processing device or multiple processors. Although the steps, operations, or computations may be presented in a specific order, this order may be changed in different embodiments. In some embodiments, multiple steps shown sequentially in this specification can be performed at the same time. The sequence of operations described herein can be interrupted, suspended, or otherwise controlled by another process, such as an operating system, kernel, etc. The routines can operate in an operating system environment or as stand-alone routines occupying all, or a substantial part, of the system processing.

In the description herein for embodiments of the present invention, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

Also in the description herein for embodiments of the present invention, a portion of the disclosure recited in the specification contains material, which is subject to copyright protection. Computer program source code, object code, instructions, text or other functional information that is executable by a machine may be included in an appendix, tables, figures or in other forms. The copyright owner has no objection to the facsimile reproduction of the specification as filed in the Patent and Trademark Office. Otherwise all copyright rights are reserved.

A 'computer' for purposes of embodiments of the present invention may include any processor-containing device, such as a mainframe computer, personal computer, laptop, notebook, microcomputer, server, personal data manager or 'PIM' (also referred to as a personal information manager), smart cellular or other phone, so-called smart card, set-top box, or any of the like. A 'computer program' may include any suitable locally or remotely executable program or sequence of coded instructions, which are to be inserted into a computer, well known to those skilled in the art. Stated more specifically, a computer program includes an organized list of instructions that, when executed, causes the computer to behave in a predetermined manner. A computer program contains a list of ingredients (called variables) and a list of directions (called statements) that tell the computer what to do with the variables. The variables may represent numeric data, text, audio or graphical images. If a computer is employed for synchronously presenting multiple video program ID streams, such as on a display screen of the computer, the computer would have suitable instructions (e.g., source code) for allowing a user to synchronously display multiple video program ID streams in accordance with the embodiments of the present invention. Similarly, if a computer is employed for presenting other media via a suitable directly or indirectly coupled input/output (I/O) device, the computer would have suitable instructions for allowing a user to input or output (e.g., present) program code and/or data information respectively in accordance with the embodiments of the present invention.

A 'computer readable medium' for purposes of embodiments of the present invention may be any medium that can contain, store, communicate, propagate, or transport the computer program for use by or in connection with the instruction execution system apparatus, system or device. The computer readable medium can be, by way of example only but not by limitation, an electronic, magnetic, optical, electromagnetic, infrared, or semiconductor system, apparatus, system, device, or computer memory. The computer readable medium may have suitable instructions for synchronously presenting multiple video program ID streams, such as on a display screen, or for providing for input or presenting in accordance with various embodiments of the present invention.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Further, at least some of the components of an embodiment of the invention may be implemented by using a programmed general-purpose digital computer, by using application specific integrated circuits, programmable logic devices, or field programmable gate arrays, or by using a network of interconnected components and circuits. Connections may be wired, wireless, by modem, and the like.

It will also be appreciated that one or more of the elements depicted in the drawings/figures can also be implemented in a more separated or integrated manner, or even removed or rendered as inoperable in certain cases, as is useful in accordance with a particular application.

Additionally, any signal arrows in the drawings/Figures should be considered only as exemplary, and not limiting, unless otherwise specifically noted. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention. Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

What is claimed is:

1. A method for suppressing flow of data packets in a network, the network comprising at least one virtual local area network (VLAN), at least one provider edge (PE) having at least one active virtual circuit (VC), at least one virtual forwarding instance (VFI) and a multi protocol label switching (MPLS) system, the method comprising:

specifying various types of data packets that need to be regulated;

identifying the type of data packets generated from and sent to each VLAN;

configuring a level of suppression for each type of data packets generated from and sent to each VLAN;

determining a number of active virtual circuits (VCs) for the VLAN, wherein the number of active VCs vary dynamically;

determining rate of flow of the identified types of data packets sent to the MPLS from the VLAN based on replication of the one or more input packets on the determined number of active VCs; and allowing the flow of data packets from the VLAN to the MPLS system, if the flow of data packets is below the level of suppression.

2. The method of claim 1 further comprises reporting to a user the rate of flow of the identified types of data packets sent between VLAN and the data switching system.

3. The method of claim 1, wherein the level of suppression is further configured on per VFI basis.

4. A system for regulating flow of data packets in a network, wherein the network comprises at least one VLAN, at least one VFI, and a data switching system, the system comprising:
   a data identifier for identifying the type of data packet, wherein the type of data packet is at least one of unicast, multicast and broadcast;
   a configuration module for configuring a data packet flow policy criteria for each VLAN;
   a calculator for determining the rate of flow of data packets sent between the VLAN and the data switching system based on a number of active virtual circuits (VCs) for the VLAN, where in the number of active VCs vary dynamically, rate of the flow based on replication of packets on the determined number of active VCs; and
   a data packet flow regulator for regulating the packet flow associated with the VLAN according to policy criteria.

5. The system of claim 4 further comprising a user notification module to inform the user the rate of flow of the data packets.

6. The system of claim 4 wherein the data switching system comprises a multi protocol label switching (MPLS) system.

7. The system of claim 4 wherein the data packet flow policy criteria is configured for each VFI.

8. A method comprising:
   receiving one or more input packets from a virtual local area network (VLAN);
   determining a data suppression level for the VLAN;
   determining a number of active virtual circuits (VCs) for the VLAN, wherein the number of active VCs vary dynamically;
   determining a data packet flow rate based on replication of the one or more input packets on the determined number of active VCs;
   determining if the data packet flow rate is higher than the data suppression level; and
   suppressing sending of at least a portion of the one or more input packets on the active virtual circuits if the data packet flow rate is higher than the data suppression level.

9. The method of claim 8, wherein the active VCs are distributed on a plurality of line cards (LCs) and the suppressing is performed on the plurality of LCs.

10. The method of claim 8, further comprising replicating the one or more input packets using the active VCs if the data packet flow rate is lower than the data suppression level.

11. The method of claim 8, further comprising:
   determining a type of input packet in the one or more input packets, wherein different data suppression levels are applied to different types of input packets.

12. The method of claim 11, wherein suppressing comprises suppressing one or more input packets based on the type of input packet.

13. The method of claim 8, wherein the one or more input packets are received from a user-side of the VLAN and the suppression is for a data switching side of the VLAN.

14. An apparatus comprising:
   one or more processors; and
   logic encoded in one or more computer readable mediums for execution by the one or more processors and when executed operable to:
   receive one or more input packets from a virtual local area network (VLAN);
   determine a data suppression level for the VLAN;
   determine a number of active virtual circuits (VCs) for the VLAN, wherein the number of active VCs vary dynamically;
   determine a data packet flow rate based on replication of the one or more input packets on the determined number of active VCs;
   determine if the data packet flow rate is higher than the data suppression level; and
   suppress sending of at least a portion of the one or more input packets on the active virtual circuits if the data packet flow rate is higher than the data suppression level.

15. The apparatus of claim 14, wherein the active VCs are distributed on a plurality of line cards (LCs) and the suppressing is performed on the plurality of LCs.

16. The apparatus of claim 14, wherein the logic when executed is further operable to replicate the one or more input packets using the active VCs if the data packet flow rate is lower than the data suppression level.

17. The apparatus of claim 14, wherein the logic when executed is further operable to determine a type of input packet in the one or more input packets, wherein different data suppression levels are applied to different types of input packets.

18. The apparatus of claim 17, wherein logic operable to suppress comprises logic operable to suppress one or more input packets based on the type of input packet.

19. The apparatus of claim 14, wherein the one or more input packets are received from a user-side of the VLAN and the suppression is for a data switching side of the VLAN.

* * * * *